(12) United States Patent
Takaoka et al.

(10) Patent No.: US 11,807,310 B2
(45) Date of Patent: Nov. 7, 2023

(54) CAB

(71) Applicant: Caterpillar SARL, Geneva (CH)

(72) Inventors: Tetsuji Takaoka, Akashi (JP); Masaya Yorifuji, Akashi (JP); Kentaro Tabata, Kobe (JP); Yusuke Doi, Kobe (JP)

(73) Assignee: Caterpillar SARL, Geneva (CH)

( * ) Notice: Subject to any disclaimer, the term of this patent is extended or adjusted under 35 U.S.C. 154(b) by 0 days.

(21) Appl. No.: 17/530,174

(22) Filed: Nov. 18, 2021

(65) Prior Publication Data

US 2022/0153355 A1 May 19, 2022

(30) Foreign Application Priority Data

Nov. 18, 2020 (JP) .................................. 2020-191810

(51) Int. Cl.
*B62D 33/06* (2006.01)
*B60J 5/04* (2006.01)
*B62D 25/24* (2006.01)

(52) U.S. Cl.
CPC ........ *B62D 33/0617* (2013.01); *B60J 5/0487* (2013.01); *B62D 25/24* (2013.01)

(58) Field of Classification Search
CPC ..... B62D 33/0617; B62D 25/24; B60J 5/0487
See application file for complete search history.

(56) References Cited

U.S. PATENT DOCUMENTS

| 5,125,716 | A | * | 6/1992 | Smith | B60J 5/0487 49/501 |
| 6,189,954 | B1 | * | 2/2001 | Martin, Jr. | B62D 33/0617 296/190.08 |
| 6,244,369 | B1 | * | 6/2001 | Yunoue | E02F 3/325 296/190.08 |
| 11,376,929 | B2 | * | 7/2022 | Pennings | E05B 83/36 |
| 2014/0017053 | A1 | * | 1/2014 | Tanaka | E02F 9/16 414/687 |
| 2021/0292996 | A1 | * | 9/2021 | Sasaki | B62D 33/0617 |

FOREIGN PATENT DOCUMENTS

JP 5616323 B2 10/2014

* cited by examiner

*Primary Examiner* — Jason S Morrow

(57) ABSTRACT

To provide a cab in which opening and closing of a door is hardly inhibited even if a cab frame or a door is deformed. A cab comprises a cab main body having a cab frame and a doorway formed in the cab frame. The cab comprises a door that opens and closes the doorway of the cab main body. The door is installed to the cab main body so as to be opposed to the side surface of the cab frame in a closed state of the doorway.

18 Claims, 5 Drawing Sheets

CAB

CROSS-REFERENCE TO RELATED APPLICATION

This application claims priority under 35 USC § 119 and the Paris Convention to Japanese Patent Application 2020-191810 filed on Nov. 18, 2020.

TECHNICAL FIELD

The present invention relates to a cab provided in a working machine for use with forestry industry, for example.

BACKGROUND ART

Vehicles equipped with forestry attachments attached to working machines using hydraulic shovels, etc. as a base are used at forestry sites. A harvester, known as a forestry attachment, is set up at roots of upright trees, and employed in operations for felling the trees cut with a built-in chainsaw, delimbing, cutting to a predetermined length, and other operations.

Since long lumbers are moved at forestry worksites, the working machine often comes into contact with the lumbers. Therefore, a wire mesh guard is provided on a front surface of a driver's seat, and the ones to prevent damage of a windshield, or the ones made of polycarbonate which is hard to damage a front window shield have been proposed (see, Patent Literature 1, for example).

PRIOR ART LITERATURES

Patent Literatures

PATENT LITERATURE 1: Japanese Patent No. 5616323.

SUMMARY OF THE INVENTION

Problems to be Solved by the Invention

The door of the driver's cab of a general hydraulic shovel or the like is often fitted into a recessed portion on the side surface of the cab frame in a closed state of the door for purposes of airtightness, waterproofness or the like. In the case of such a structure in which the door is fitted into the recessed portion, an additional configuration will be needed so as to prevent the door becoming unopenable and thus the operator from being trapped inside the driver's cab when the cab frame is deformed by the contact with lumber.

The present invention has been made in view of such a point, and an object of the present invention is to provide a cab in which opening and closing of the door is hardly inhibited even if the cab frame or the door is deformed.

Means for Solving the Problems

The invention according to claim 1 is a cab comprising: a cab main body having a cab frame and a doorway formed in this cab frame; and a door that opens and closes the doorway of this cab main body, wherein the door is installed to the cab main body so as to be opposed to a side surface of the cab frame in a closed state of the doorway.

The invention according to claim 2 is the cab according to claim 1, wherein the cab main body has a window formed on the cab frame on a surface adjacent to the doorway, and wherein the cab main body comprises a window covering member which is attached to the cab main body so as to cover this window, with an edge portion thereof on the doorway side protruding from the cab frame so as to be opposed to an end portion of the door.

The invention according to claim 3 is the cab according to claim 1 or 2, wherein the cab comprises a sealing member sandwiched between the door in the closed state of the doorway and the side surface of the cab frame.

The invention according to claim 4 is the cab according to any one of claims 1 to 3, wherein the cab comprises eaves arranged on the cab main body above the door.

Favorable Effects of the Invention

According to claim 1 of the present invention, even if lumber or the like, for example, comes into contact with the door or the cab frame and thereby the door or the cab frame is deformed, the opening and closing of the door is hardly inhibited.

According to claim 2 of the present invention, the door is protected against the contact with lumber or the like by the edge portion of the window covering member, and thereby the deformation of the door can be suppressed and the opening and closing of the door is hardly inhibited.

According to claim 3 of the present invention, the airtightness of the driver's cab can be maintained by the sealing member.

According to claim 4 of the present invention, the ingress of rain into the cab main body can be suppressed by the eaves.

DETAILED DESCRIPTION

Hereinafter, the present invention will be described in detail in accordance with an embodiment illustrated in FIGS. 1 to 5.

Figure 5:
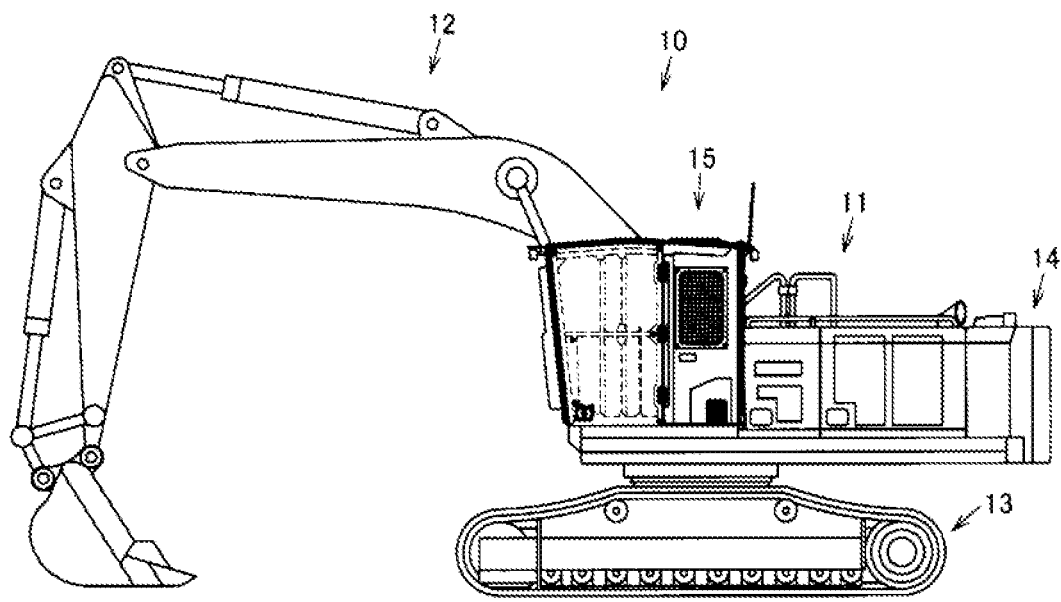
FIG. 5 is a side view illustrating a working machine comprising the cab as above.

FIG. 5 illustrates a working machine 10. The working machine 10 is a machine for forestry applications which is also called a forestry machine. As the working machine 10, forestry exclusive machine may be used, but in the present embodiment, a hydraulic shovel-based machine will be described as an example. In the illustrated example, the working machine 10 comprises a machine body 11 and a working device 12 serving as a working arm movably provided on the machine body 11. Respective parts of the working machine 10 are actuated by fluid pressure actuators. The fluid pressure actuators are, for example, a hydraulic cylinder, a hydraulic motor, etc., and a working oil as a working fluid discharged from a pump operated by an engine mounted on the machine body 11 is supplied and discharged by flow rate control and direction control being performed by a control valve according to the operation of an operator, thereby enabling each actuation.

In the present embodiment, the machine body 11 has a lower traveling body 13 that can travel by crawlers, tires, etc.; an upper revolving body 14 that is revolvably provided on the lower traveling body 13; and a cab 15 that is provided on the upper revolving body 14, and a working device 12 is arranged on the upper revolving body 14. An attachment such as a harvester may be mounted to the working device 12. Further, in the present environment, the cab 15 may be arranged movably in a vertical direction with respect to the upper revolving body 14.

The cab 15 shown in FIGS. 1 to 4 has a cab main body 20. The cab main body 20 comprises a box-shaped cab frame 24 having substantially six plane faces, which is formed of a structure employing square pipe materials or deformed steel pipes.

The cab frame 24 is used to surround a driver's seat 25 on which the operator is seated. That is, a driver's cab comprising the driver's seat 25 is formed inward of the cab frame 24. Hereinbelow, regarding front and rear, left and right, and up and down, the direction viewed from the operator seated on the driver's seat 25 is set as the reference. On the left and right sides in front of the driver's seat 25, in the driver's cab, there are arranged levers 26 serving as operating bodies in order for the operator to operate the working device 12 (FIG. 5) located on the right side of the cab 15. At the front of the driver's seat 25, there are arranged a lever 27, pedals 28 and the like in order for the operator to operate the travel of the lower traveling body 13 (FIG. 5), and a monitor and the like are arranged on the right ahead of the driver's seat 25.

The cab frame 24 includes left and right front pillars (A pillars) 31, 31 disposed extending from the front portion to the upper portion, and left and right rear pillars (C pillars) 32, 32 disposed extending from the rear portion to the upper portion. Further, a front header 34 is disposed between the upper portions of the front pillars 31, 31, and a front cross member 35 is disposed between the lower portions of the front pillars 31, 31. In addition, a rear header is disposed between the upper portions of the rear pillars 32, 32. In the present embodiment, the front pillar 31 is made of a square pipe material in a square cross-sectional shape.

Further, in the present embodiment, a center pillar (B pillar) 38 is disposed extending to the upper portion, in the central portion in the front-rear direction of the cab frame 24. Regarding the center pillar 38, an example of disposing on the left and right sides will be described, but the center pillar 38 may be disposed only on the left side. In the Drawings, only the center pillar 38 on the left side is shown. In the present embodiment, the center pillar 38 is made of a square pipe material in a square cross-sectional shape, and is formed thicker than the front pillar 31. Further, between the upper portions of the front pillar 31 and the center pillar 38, a side header 40 is disposed extending from front to rear. The side header 40 may be integrally formed with the front pillar 31 or the rear pillar 32.

In addition, respective panels are disposed on the cab frame 24. In the present embodiment, on the cab frame 24, a floor surface portion 42 serving as a lower panel supporting the driver's seat 25 is disposed at the lower portion; a ceiling surface portion 43 serving as an upper panel is disposed at the upper portion; a rear panel 44 is disposed between the lower portions of the rear pillars 32, 32; and a side panel 45 is disposed between the center pillar 38 and the rear pillar 32. In the illustrated example, a skylight 47 located at the upper portion of the front side of the driver's seat 25 is opened at a position closer to the front portion of the ceiling surface portion 43; a rear window 48 located behind the driver's seat 25 is opened at a position closer to the upper portion of the rear panel 44; and a lateral rear window 49 located at a sideway of the driver's seat 25 is opened at a position closer to the upper portion of the side panel 45. The skylight 47, the rear window 48, and the lateral rear window 49 are covered with window shields 51, 52, and 53, which are transparent window covering members, respectively. In particular, the window shield 53 of the lateral rear window 49 is covered with a net-like guard member 54. Furthermore, in the present embodiment, the communication device 56 is arranged at a position closer to the rear portion of the ceiling surface portion 43. A part of the communication device 56 is introduced to the inside of the driver's cab.

The cab frame 24 is formed with a front window 60, which is a window located ahead of the driver's seat 25, surrounded by the front pillars 31, 31, the front header 34, and the front cross member 35; a doorway 61 for ascending/descending to/from the driver's cab located at the left ahead of the driver's seat 25 is formed, surrounded by the front pillar 31 on left side, the center pillar 38 on the left side, and the side header 40 on the left side which is the opposite side to the working device 12 (FIG. 5); and a lateral front window located at the right ahead of the driver's seat 25 is formed, surrounded by the front pillar 31 on the right side, the center pillar 38 on the right side, and the side header 40 on the right side.

The front window 60 is located on the front surface of the cab main body 20 (the cab frame 24). The doorway 61 is located on a surface adjacent to a surface on which the front window 60 is located, in the cab main body 20 (cab frame 24), i.e., on the left side surface in the present embodiment. The front window 60 is covered with a front window shield 64 which is a window covering member, i.e., a window shield; the doorway 61 is opened/closed by a door 65; and the lateral rear window 49 is covered with a side window shield serving as a window covering member. Further, in the present embodiment, a handrail 66 serving as a gripping portion to be gripped when getting on and off the cab 15, is arranged on an inner edge of the doorway 61. The handrail 66 is located along the inner edge of the doorway 61. In the illustrated example, a plurality of handrails 66 are vertically arranged along the up and down direction on a rear side surface 31a of the front pillar 31 on the left side that constitutes the inner edge of the doorway 61.

The front window shield 64 is formed of a transparent member, and is attached ahead of the front pillars 31, 31 with an adhesive or a mounting member such as a bolt. In the illustrated example, in the cab frame 24, the front pillars 31, 31 on the left and right sides, the front header 34, and the front cross member 35 forming the side surfaces opposing to the front window shield 64 serve as opposed members opposed to the front window shield 64.

As the material of the front window shield 64, preferably synthetic resin, especially impact-resistant polycarbonate is suitably used, but this shall not apply to cases where falling under materials that are highly transparent and are not easily damaged. The front window shield 64 has a shape which covers the whole of the front window 60, and is formed in a substantially square shape which substantially matches the shape of the front surface of the driver's seat 25. In the present embodiment, the front window shield 64, as shown in FIG. 1(b), protrudes to the left side, i.e., an edge portion 64a on the left side, i.e., on the doorway 61 side (the door 65 side) protrudes to the left side with respect to front pillar 31 on the left side of the cab frame 24. The protrusion amount W of the front window shield 64 from the front pillar 31 is set to a width enough to fully hide the door 65 in the closed state of the doorway 61, in the front view. That is, the front end portion of the door 65 in the closed state of the doorway 61 is opposedly located, behind the edge portion 64a of the front window shield 64, and the protrusion amount W is set to be almost matched or larger, compared with the thickness of the door 65. Accordingly, the door 65 is adapted to be guarded by the edge portion 64a of the front window shield 64.

Figure 1:
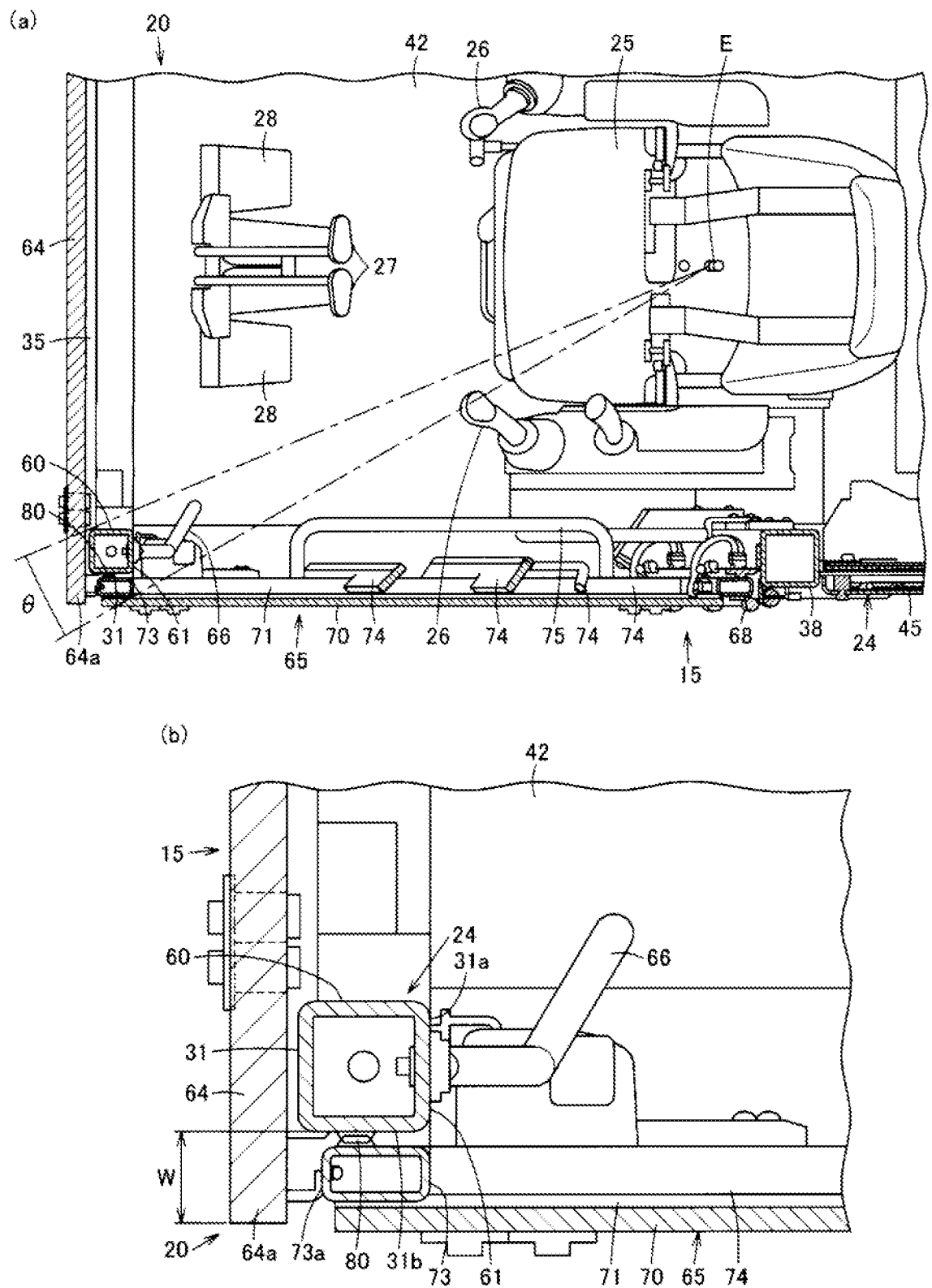
FIG. 1(a) is a cross-sectional view at a line I-I equivalent position of FIG. 3 illustrating an embodiment of a cab according to the present invention.
FIG. 1(b) is a partial enlarged view of FIG. 1(a).
Figure 2:
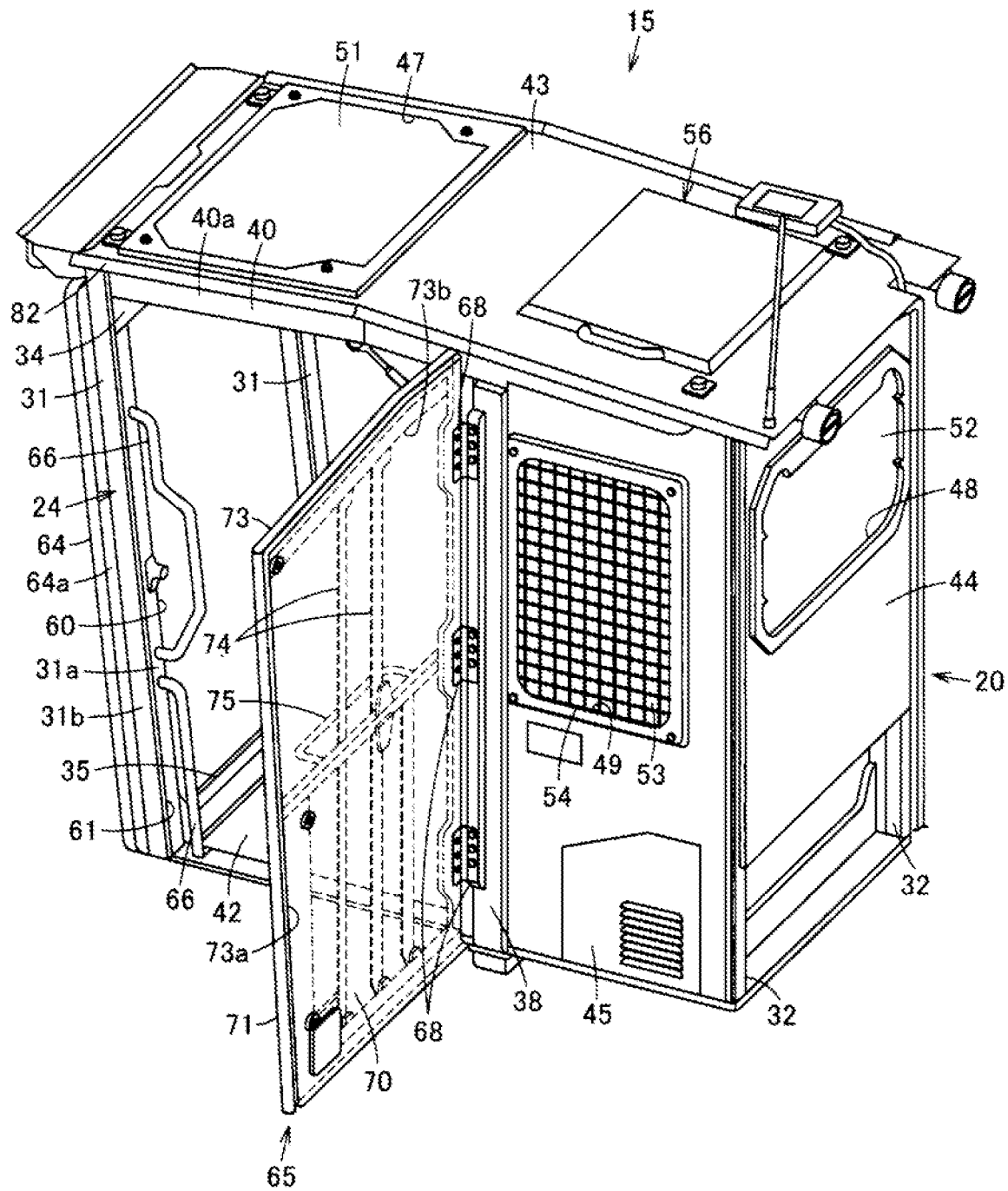
FIG. 2 is a perspective view illustrating the cab as above in an opened state of a door.
Figure 3:
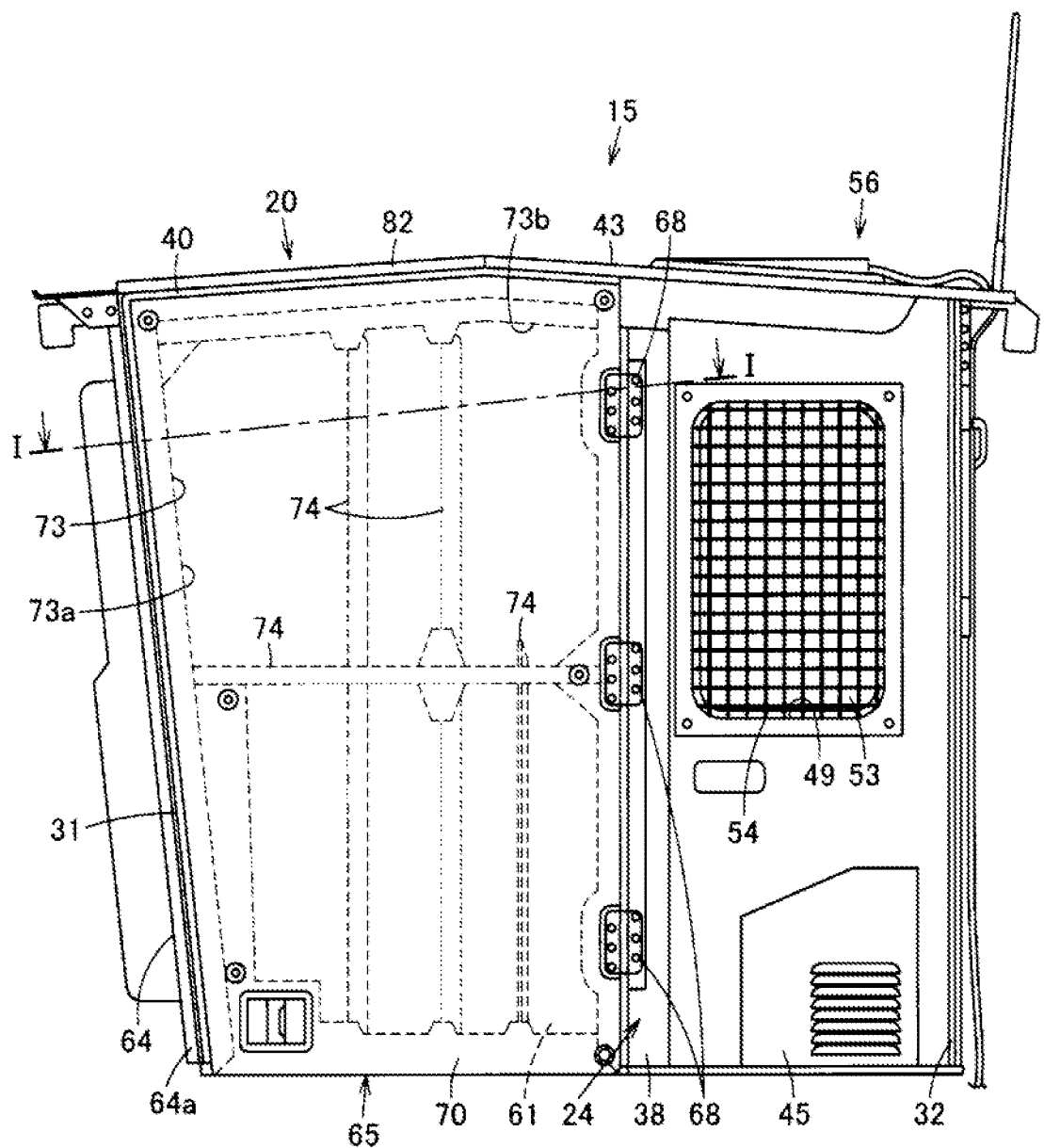
FIG. 3 is a side view illustrating the cab as above in a closed state of the door.
Figure 4:
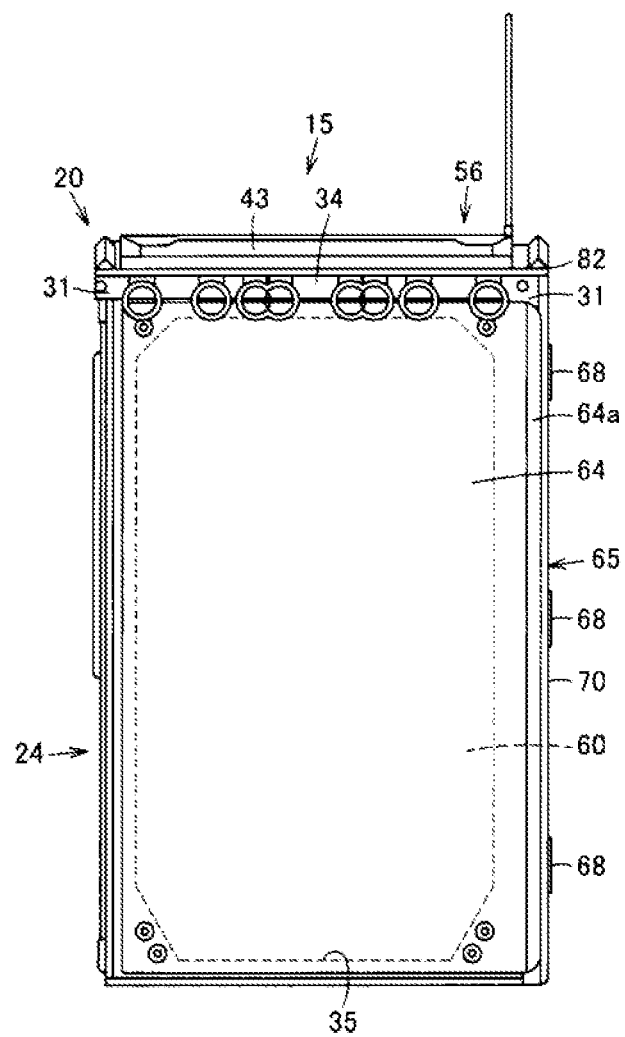
FIG. 4 is a front view illustrating the cab as above in the closed state of the door.

As shown in FIGS. 1(a), 2 and 3, the door 65 is turnably installed to the cab frame 24 by hinges 68 that is turned around an axis. In short, the door 65 can open and close the doorway 61 by turning. In the illustrated example, the rear portion of the door 65 is fixed to the center pillar 38 on the left side by the hinges 68, and the front portion can be turned in the left-right direction about the rear portion. Accordingly, in the present embodiment, the door 65 has a fixed side at the rear portion, and a movable side at more front side than the rear portion, and the center pillar 38 serves as a door mounting member for mounting the door 65. Further, the door 65 is set to open outwardly with respect to the driver's cab.

In the present embodiment, the door 65 comprises a door main body 70 and a door frame 71 serving as a reinforcing portion for reinforcing the door main body 70. Further, the door 65 is provided with a lock mechanism for lockingly fixing the door 65 to the cab frame 24 of the cab main body 20 in the closed state of the doorway 61.

The door main body 70 is formed in a plate shape by a transparent member. The door main body 70 is formed in a size that covers the whole of the doorway 61, and is formed in a shape corresponding to the shape of the doorway 61. In the illustrated example, the door main body 70 is formed in a square shape. The door frame 71 is installed on the back side of the door main body 70, i.e., the driver's cab side.

The door frame 71 is made of an opaque member, for example, such as a metal. In the present embodiment, the door frame 71 has a frame body 73 arranged along the outer edge of the door main body 70, and supports 74 arranged vertically and horizontally inside the frame body 73. Further, in the present embodiment, a handle 75, which the operator in the driver's cab grips when opening and closing the door 65, is attached to the supports 74, in the door frame 71.

The frame body 73 is formed in a square frame shape corresponding to the outer shape of the door main body 70. In the present embodiment, the frame body 73 is configured such that a front frame portion 73a arranged in the vertical direction along the front edge portion of the door main body 70 and an upper frame portion 73b arranged in the front-rear direction along the upper edge portion of the door main body 70 serve as opposing portions that are opposed to front pillar 31 on the left side and the side header 40 on the left side forming the edge portions of the doorway 61 of the cab frame 24, respectively.

The door 65 is installed to the cab main body 20 so as to be in contact with the side surface where the doorway 61 of the cab frame 24 is located, i.e., the left side surface in the present embodiment, and is arranged opposite to the side surface of the cab frame 24 in the closed state of the doorway 61. In other words, the door 65 is arranged so as not to enter the inner side (i.e., the driver's cab side) than a virtual surface including the outer side surfaces of at least the front pillar 31 on the left side and the side header 40 on the left side of the cab frame 24 of the frame structure, within the entire movable range. In the present embodiment, the door 65 is configured such that, within the entire movable range, at least the whole of or substantially the whole of movable side is located in outer side than a virtual outer contour surface of the cab frame 24. In the illustrated example, in the cab frame 24, the front pillar 31 on the left side and the side header 40 on the left side forming the side surface opposing to the door 65 serve as door opposed members opposing to the door 65 in the closed state of the doorway 61.

The door 65 of the present embodiment is located on the outer side than a left side surface 31b which is the door opposing surface of the front pillar 31, and a left side surface 40a which is the door opposing surface of the side header 40, both forming the side surface of the cab frame 24, within the entire movable range. Further, in the closed state of the doorway 61, the end surfaces of movable side of the door 65, i.e., the front end surface, the upper end surface, and the lower end surface are configured such that the cab frame 24 is not located so as to be opposed to their facial directions. In the illustrated example, in the closed state of the doorway 61 by the door 65, the cab frame 24 (the front pillar 31 and the side header 40) is located only on the right sideway of the door 65, and the cab frame 24 is not located ahead, above and underneath the door 65. In other words, at least the front pillar 31 and side header 40 of the cab frame 24 have no portions protruding toward the outer side than the surface of the driver's cab side of the door 65, and the whole of at least the front pillar 31 and side header 40 is located on the driver's cab side i.e., the inner side than the surface of the driver's cab side of the door 65 in the closed state of the doorway 61.

The upper portion of the door 65 is located apart downward with respect to the ceiling surface portion 43 of the cab frame 24.

A sealing member 80 is attached to one side of the door 65 and the side surface of the cab frame 24. The sealing member 80, also called a weather strip, is sandwiched between the door 65 in the closed state of the doorway 61 and the side surface of the cab frame 24. That is, the sealing member 80 maintains the airtightness of the whole periphery of the contact surface between the door 65 and the cab frame 24, and prevents rain or the like from entering the driver's cab. In the present embodiment, the sealing member 80 is attached to the driver's cab or the cab frame 24 side of the door 65; in the illustrated example, the door frame 71 or the frame body 73, but without being limited to this, the sealing member 80 may be attached to the side surface of the cab frame 24. The sealing member 80 is formed of an elastic body such as rubber.

An eaves 82 are preferably formed above the door 65. The eaves 82 serve as a rain shield portion that prevents raindrops from entering from above. The eaves 82 are formed so as to protrude sideway from the left side portion of the ceiling surface portion 43 of the cab main body 20. The eaves 82 are set to be almost matched or larger, compared with the thickness of the door 65 at a position where the doorway 61 is closed.

Next, the action and the effect of the illustrated embodiments will be described.

Since it is configured such that the door 65 of the cab 15 is installed to the cab main body 20 so as to come into contact with the side surface of the cab frame 24, and the door 65 is arranged so as to be opposed to the side surface of the cab frame 24 in the closed state of the doorway 61, even if the cab frame 24 or the door 65 is deformed due to contact with lumber during working or the like, the door 65 is unlikely to be fitted into the cab frame 24 and thus to be hardly opened. That is, even if lumber or the like comes into contact with the cab 15 and the cab frame 24 of the cab main body 20 is deformed, the door 65 is outside the cab frame 24, so that the contact surface between the door 65 and the cab frame 24 is only deviated, and it is hard to become the state where the door 65 will be deformed together with the cab frame 24 and will not be opened. In addition, even if lumber or the like comes into contact with the door 65 and the door 65 is deformed, the door 65 is situated on the outer side than the cab frame 24, and thereby, it is hard to become the state where the door 65 will be inserted inside the cab frame 24 and cannot be opened.

Consequently, even if the cab frame 24 or the door 65 is deformed, opening and closing of the door 65 is hardly inhibited.

Further, for example, as in the conventional case, if the door is provided so as to fit into the recessed portion formed in the cab frame made of deformed steel pipes, there is generated a dead angle with a width in the front-rear direction obtained by combining the front pillar on the left side of the cab frame when viewed from the operator seated in the driver's seat and the front frame portion of the door frame located behind the front pillar. In contrast, in the present embodiment, since the cab frame 24 and the front frame portion 73a of the door frame 71 of the door 65 overlap in the left-right direction, as shown in FIG. 1(a), the width (angle θ) of the dead angle portion in the front-rear direction from the view-point E of the operator seated in the driver's seat 25 becomes narrower, and thus the visibility from the driver's seat 25 becomes also better.

Further, since the edge portion 64a on the doorway 61 side of the front window shield 64 attached to the cab main body 20 covering the front window 60 is caused to protrude from the cab frame 24 and is caused to oppose to the front end portion of the door 65, the edge portion 64a of the front window shield 64 guards the door 65 against the contact with lumber or the like from ahead and sideway, and even if the lumber or the like collides from ahead or sideway, the deformation of the door 65 can be suppressed and it is hard to become the case where the door 65 is deformed and thereby it cannot be opened, and the opening and closing of the door 65 is hardly inhibited. In particular, since the protrusion amount W of the front window shield 64 from the cab frame 24 is set to a width enough to fully hide the door 65, in the front view, the door 65 can be definitely guarded against the contact with the lumber or the like from ahead or sideway.

Even when the handrail 66 is arranged so as to protrude toward the left side surface 31b side of the front pillar 31 on the left side, if the edge portion 64a on the doorway 61 side of the front window shield 64 should be set to a width sufficient to fully hide the upper portion handrail 66, the door 65 can be prevented from being deformed so as to be clamped by the handrail 66 by colliding with the lumber or the like.

Furthermore, since the sealing member 80 sandwiched between the door 65 in the closed state of the doorway 61 and the side surface of the cab frame 24 is provided, the airtightness of the driver's cab can be maintained by the sealing member 80.

Further, by providing the eaves 82 on the cab main body 20 above the door 65, the intrusion of rain into the driver's cab inside the cab main body 20 can be suppressed by the eaves 82.

In the above-described one embodiment, the door 65 is to be arranged on the left side of the cab main body 20 (cab frame 24), but without being limited to this, may be arranged on the rear side of the cab main body 20 (cab frame 24). In this case, it can be operated in the same manner as in the above-described embodiment by configuring such that the rear edge portion of the side window shield serving as a window shield covering the window formed on the left side of the cab main body 20 protrudes more than the rear portion of the rear pillar 32.

INDUSTRIAL APPLICABILITY

The present invention has industrial applicability for business operators engaged in the manufacturing business, sales business, etc. of forestry working machines.

What is claimed is:

1. A cab comprising:
   a cab main body having a front end, a rear end, a first lateral side and a second lateral side, and a cab frame mounted thereon, the cab frame comprising:
      a first front pillar and a second front pillar extending upward from a floor surface proximate the front end and proximate the first side and the second side, respectively, the first front pillar having a first front pillar side surface facing outward from the cab main body,
      a first rear pillar and a second rear pillar extending upward from the floor surface proximate the rear end and proximate the first side and the second side, respectively,
      a first side header mounted to and extending between tops of the first front pillar and the first rear pillar, the first side header having a first side header side surface facing outward from the cab main body,
      a first center pillar extending upward from the floor surface proximate the first lateral side and disposed between the first front pillar and the second front pillar, wherein the first front pillar, the first side header and the first center pillar define a doorway formed in this cab frame, and
      a front window formed on the cab frame on a front surface adjacent to the doorway;
   a front window shield which is attached to the cab main body so as to cover this front window, with an edge portion of the front window shield on the first lateral side protruding from the cab frame beyond the first front pillar side surface; and
   a door having a door main body with a door frame installed on a cab side of the door main body, the door frame including a front frame portion arranged in a vertical direction along a front edge portion of the door main body, and an upper frame portion arranged in a front-rear direction along an upper edge portion of the door main body, wherein the door is movably mounted to the cab main body proximate the doorway so that the door opens and closes the doorway of this cab main body,
   wherein the door is installed to the cab main body so that the front frame portion faces and is opposed to the first front pillar side surface and the upper frame portion faces and is opposed to the first side header side surface of the cab frame in a closed state of the doorway, and
   wherein the edge portion of the front window shield protrudes beyond the first front pillar side surface by a protrusion amount so as to be opposed to the front frame portion of the door frame.

2. The cab according to claim 1, comprising a sealing member sandwiched between the front frame portion of the door in the closed state of the doorway and the first side pillar side surface of the cab frame.

3. The cab according to claim 1, comprising eaves arranged on the cab main body above the door.

4. The cab according to claim 1, wherein the protrusion amount is at least equal to a thickness of the door.

5. The cab according to claim 1, wherein the door main body and the door frame do not enter an inner side of the cab frame past the first side pillar side surface and the first upper header side surface in the closed state of the doorway.

6. The cab according to claim 1, wherein the first lateral side is a left side of the cab main body.

7. A cab for a working machine having a front end, a rear end, a left side and a right side, the cab comprising:
- a cab main body having a cab frame comprising:
  - a left front pillar extending upward from a floor surface proximate the front end and the left side of the cab, the left front pillar having a pillar left side surface facing outward from the cab main body,
  - a left side header mounted to and extending rearward from a left front pillar top end of the left front pillar, the left side header having a header left side surface facing outward from the cab main body,
  - a left center pillar extending upward from the floor surface proximate the left side of the cab and having the left side header mounted to a left center pillar top end of the left center pillar, wherein the left front pillar, the left side header and the left center pillar define a doorway formed in the cab frame, and
  - a front window formed on the cab frame on a front surface adjacent to the doorway;
- a front window shield which is attached to the cab main body so as to cover the front window, with an edge portion of the front window shield on the left side protruding from the cab frame beyond the pillar left side surface; and
- a door having a door main body with a door frame installed on a cab side of the door main body, wherein the door is movably mounted to the cab main body at the left center pillar so that the door opens and closes the doorway of the cab main body,
- wherein the door frame portion is opposed and faces the pillar left side surface and the header left side surface of the cab frame in a closed state of the doorway, and
- wherein the edge portion of the front window shield protrudes beyond the pillar left side surface by a protrusion amount so as to be opposed to a front frame portion of the door frame.

8. The cab according to claim 7, wherein the door is turnably installed to the cab frame by hinges that turn around an axis such that the door opens and closes the doorway by turning.

9. The cab according to claim 7, wherein the door main body is formed in a door shape corresponding to a doorway shape of the doorway and the door main body covers the whole doorway.

10. The cab according to claim 7, wherein the door main body and the door frame do not enter an inner side of the cab frame past the pillar left side surface and the header left side surface in the closed state of the doorway.

11. The cab according to claim 7, wherein the protrusion amount is at least equal to a thickness of the door.

12. The cab according to claim 7, comprising a sealing member sandwiched between the door frame of the door in the closed state of the doorway and the pillar left side surface of the cab frame.

13. A cab for a working machine having a front end, a rear end, a left side and a right side, the cab comprising:
- a cab main body comprising:
  - a cab frame defining a doorway formed in the left side of the cab frame and having a left side surface facing outward from the cab main body, and
  - a front window shield which is attached to the cab main body so as to cover the front end of the cab frame, wherein an edge portion of the front window shield on the left side protrudes from the cab frame beyond the left side surface by a protrusion amount so as to be opposed to the front frame portion of the door frame; and
- a door having a door main body with a door frame installed on a cab side of the door main body, wherein the door is movably mounted to the cab main body on the left side so that the door opens and closes the doorway of the cab main body, wherein the door frame portion is opposed and faces the left side surface of the cab frame in a closed state of the doorway, and wherein edge portion of the front window shield protrudes beyond the left side surface to as to be opposed to a front frame portion of the door frame.

14. The cab according to claim 13, wherein the protrusion amount is at least equal to a thickness of the door.

15. The cab according to claim 13, wherein the cab frame comprises:
- a left front pillar extending upward from a floor surface proximate the front end and the left side of the cab, the left front pillar having a pillar left side surface portion of the left side surface facing outward from the cab main body;
- a left side header mounted to and extending rearward from a left front pillar top end of the left front pillar, the left side header having a header left side surface portion of the left side surface facing outward from the cab main body; and
- a left center pillar extending upward from the floor surface proximate the left side of the cab and having the left side header mounted to a left center pillar top end of the left center pillar, wherein the left front pillar, the left side header and the left center pillar define the doorway formed in the cab frame.

16. The cab according to claim 13, wherein the door main body is formed in a door shape corresponding to a doorway shape of the doorway and the door main body covers the whole doorway.

17. The cab according to claim 13, wherein the door main body and the door frame do not enter an inner side of the cab frame past the left side surface in the closed state of the doorway.

18. The cab according to claim 13, comprising a sealing member sandwiched between the door frame of the door in the closed state of the doorway and the left side surface of the cab frame.

* * * * *